United States Patent
Murphy

(10) Patent No.: US 10,431,103 B2
(45) Date of Patent: Oct. 1, 2019

(54) THREE-DIMENSIONAL NETWORK COVERAGE MODELING FOR UAVS

(71) Applicant: T-Mobile USA, Inc., Bellevue, WA (US)

(72) Inventor: Sean Patrick Murphy, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 185 days.

(21) Appl. No.: 15/484,774

(22) Filed: Apr. 11, 2017

(65) Prior Publication Data

US 2018/0293897 A1    Oct. 11, 2018

(51) Int. Cl.
| | |
|---|---|
| G08G 5/00 | (2006.01) |
| H04W 16/18 | (2009.01) |
| H04W 24/02 | (2009.01) |
| H04W 24/08 | (2009.01) |
| G05D 1/00 | (2006.01) |
| B64C 39/02 | (2006.01) |

(52) U.S. Cl.
CPC .......... *G08G 5/006* (2013.01); *B64C 39/024* (2013.01); *G05D 1/0022* (2013.01); *H04W 16/18* (2013.01); *H04W 24/02* (2013.01); *H04W 24/08* (2013.01); *B64C 2201/146* (2013.01)

(58) Field of Classification Search
CPC ..... H04W 16/18; H04W 24/02; H04W 24/08; G08G 1/20; G08G 5/006
See application file for complete search history.

(56) References Cited

U.S. PATENT DOCUMENTS

| | | | |
|---|---|---|---|
| 9,513,635 B1 | 12/2016 | Bethke et al. | |
| 2006/0206246 A1* | 9/2006 | Walker | G06Q 10/00 701/16 |
| 2016/0202695 A1 | 7/2016 | DeRoos et al. | |
| 2017/0024929 A1 | 1/2017 | Priest | |
| 2017/0238129 A1* | 8/2017 | Maier | H04W 4/02 455/404.2 |
| 2018/0074174 A1* | 3/2018 | Beer | G01S 7/411 |

FOREIGN PATENT DOCUMENTS

| | | |
|---|---|---|
| JP | 2017015598 A | 1/2017 |
| KR | 101160454 B1 | 6/2012 |

OTHER PUBLICATIONS

International Search Report and Written Opinion for PCT Application No. PCT/US2018/025589 dated Jul. 24, 2018, 10 pages.

* cited by examiner

*Primary Examiner* — Diane D Mizrahi
(74) *Attorney, Agent, or Firm* — Han Santos, PLLC

(57) ABSTRACT

A coverage model is generated to forecast network coverage robustness for vertically layered 3-dimensional sections of airspace above an area. Network configuration data for multiple base stations of a wireless communication network located in an area are received. Environmental data that includes information on natural and manmade features in the area are received. The airspace above the area into a plurality of vertically layered 3-dimensional sections is segregated. A coverage model is generated based at least on the network configuration data and the environmental data for predicting network coverage of the wireless communication network in the 3-dimensional sections in the airspace above the area.

20 Claims, 6 Drawing Sheets

THREE-DIMENSIONAL NETWORK COVERAGE MODELING FOR UAVS

BACKGROUND

Unmanned aerial vehicles (UAVs) are aircraft that are controlled from a ground-based control device rather than an onboard human pilot. UAVs are being used in ever increasing number of roles in both the civilian and military sectors. These roles may include law enforcement surveillance, journalism and cinematograph, scientific research and monitoring, search and rescue, cargo transport, package delivery, etc. While some UAVs can perform limited autonomous flight, UAVs generally rely on control commands provided by ground-based control devices to carry out flight maneuvers and travel per designated flight paths. Accordingly, an UAV operator may use a wireless communication network provided by a wireless carrier to communicatively link a ground-based control device of the UAV operator with UAVs that are performing flight operations. For example, the wireless communication network may be used to continuously transmit flight control commands and guidance data to a UAV, as well as receive UAV telemetry and UAV operation status information from the UAV. As a result, UAV operators are not only concerned with the robustness of the network coverage offered by a wireless communication network at or near the ground level, but also the robustness of the network coverage throughout the airspace of an area.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using 3-dimensional network coverage modeling to predict the robustness of network coverage provided by a wireless communication network. The airspace above an area may be segregated into vertically layered 3-dimensional sections. The coverage model may be generated based on network configuration data of the wireless communication network and environmental data to predict the robustness of network coverage in the vertically layered 3-dimensional sections of airspace. In some embodiments, the coverage model may be used to forecast the robustness of network signals at specific locations within specific 3-dimensional sections above the area. In some instances, such forecasting may be performed in response to queries from unmanned aerial vehicle (UAV) operators.

In other embodiments, network coverage signal robustness along a flight path of an UAV may be forecasted using the coverage model. The forecasted network coverage signal robustness values may be used to determine whether the network coverage along the flight path that traverses multiple 3-dimensional sections of airspace meets a minimum network coverage robustness threshold. In the event network coverage robustness at certain portions of the flight path fail to meet the minimum network coverage robustness threshold, network signal robustness values forecasted by the coverage model may be used to modify the portions of the flight path.

The generation of a coverage model to forecast network coverage robustness for vertically layered 3-dimensional sections of airspace may increase the fidelity of network coverage robustness predictions for elevated locations. These elevated locations may be situated within airspace corridors that are typically used by UAV for flight operations. In contrast, conventional 2-dimensional coverage models may be designed to provide network coverage robustness forecast immediately above ground level or at low altitudes. Accordingly, a coverage model that is able to forecast network coverage robustness for vertically layered 3-dimensional sections of airspace may offer greater prediction accuracy than the 2-dimensional conventional coverage models. As a result, a coverage model that is able to forecast network coverage robustness for vertically layered 3-dimensional sections of airspace may be suited to predict network coverage for UAV command and control. The techniques described herein may be implemented in a number of ways. Example implementations are provided below with reference to the following FIGS. 1-7.

Example Environment Architecture

Figure 1:
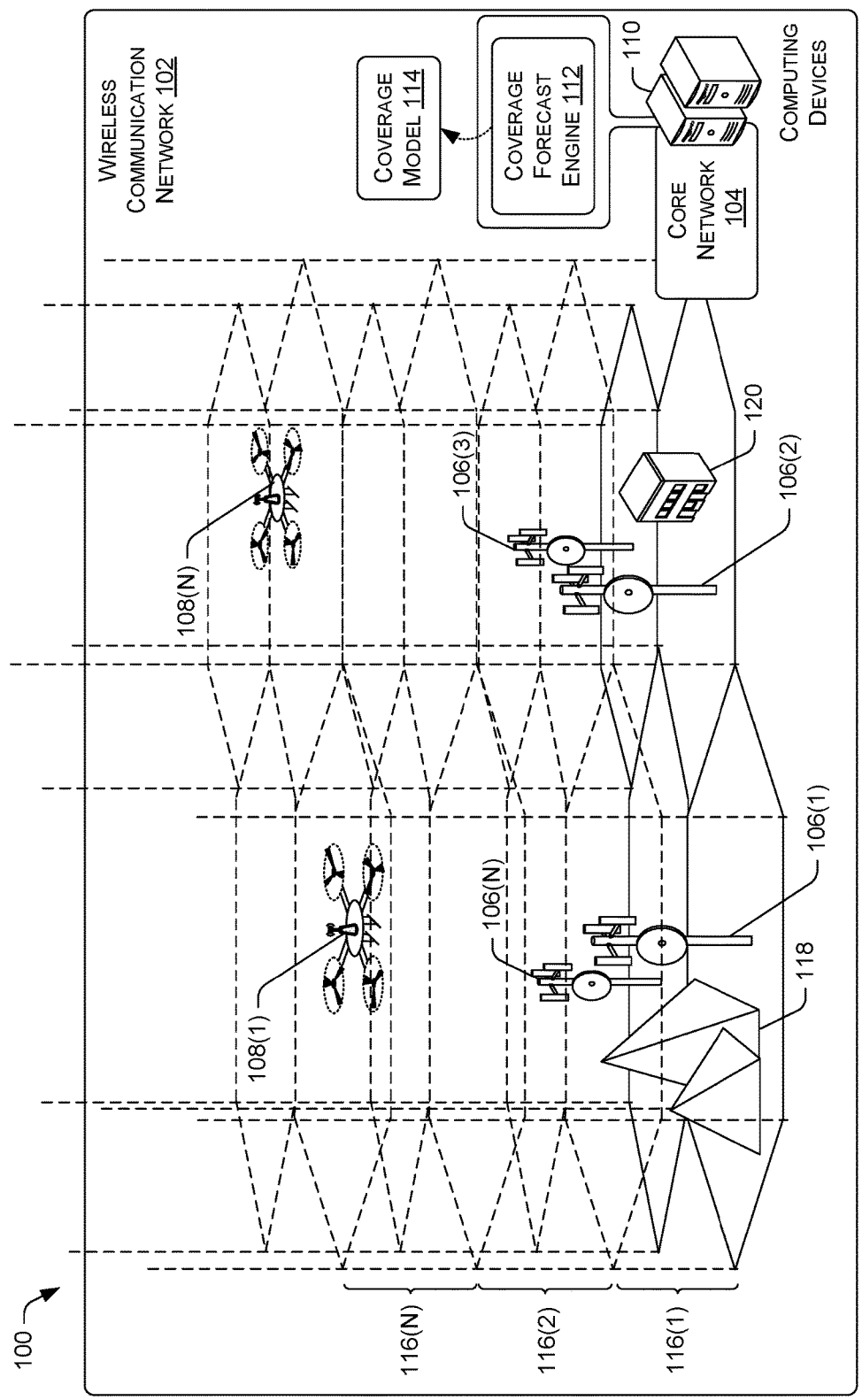
FIG. 1 illustrates an example environment for implementing 3-dimensional network coverage modeling for predicting the robustness of network coverage provided by a wireless communication network.

FIG. 1 illustrates an example environment 100 for implementing unmanned aerial vehicle (UAV)-based cellular communication service delivery. The environment 100 may include a wireless communication network 102 that is operated by a wireless telecommunication carrier. The wireless communication network 102 may include a radio access network and a core network 104. The wireless communication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The radio access network may include multiple base stations, such as base stations 106(1)-106(N). The base stations 106(1)-106(N) are responsible for handling voice and data traffic between user devices and the core network 104. In some instances, the user device may include smartphones, tablet computers, embedded computer systems, or any other device that is capable of using the wireless communication services that are provided by the wireless communication network 102. For example, the user devices may include unmanned aerial vehicles (UAVs) 108(1)-108

(N) that are controlled by UAV operators. The UAVs 108(1)-108(N) may perform different roles, such as law enforcement surveillance, journalism and cinematograph, scientific research and monitoring, search and rescue, cargo transport, etc.

Each of the base stations 106(1)-106(N) may provide a corresponding network cell that delivers telecommunication and data communication coverage. The core network 104 may use the network cells to provide communication services to user devices. For example, the core network 104 may connect the UAV 108(1)-108(N) to a ground-based control device of a UAV operator. In various embodiments, the core network 104 may include one or more computing devices 110 that implement network components. The network components may include a serving GPRS support node (SGSN) that routes voice calls to and from the public switched telephone network (PSTN), a Gateway GPRS Support Node (GGSN) that handles the routing of data communication between external packet switched networks and the core network 104. The network components may further include a Packet Data Network (PDN) gateway (PGW) that routes data traffic between the GGSN and the Internet. Additionally, a coverage forecast engine 112 may be implemented by the computing devices 110 of the core network 104.

The coverage forecast engine 112 may generate a coverage model 114 for predicting network coverage in multiple vertically layered 3-dimensional sections of airspace above an area, such as the 3-dimensional sections 116(1)-116(N). In some embodiments, a 3-dimensional section may be horizontally bounded by the ground level signal boundaries of a network cell that is provided by a corresponding base station. However, in other embodiments, a 3-dimensional section may horizontally encompass multiple network cells that are provided by corresponding base stations. The vertically layers of 3-dimensional sections may be vertically bounded by altitudes above ground level. For example, a first layer of 3-dimensional sections (e.g., 3-dimensional section 116(1)) may be situated between sea level and 100 feet above sea level. A second layer of 3-dimensional sections (e.g., 3-dimensional section 116(2)) may be situated between 100 feet above sea level and 200 feet above sea level. Likewise, a third layer of 3-dimensional sections (e.g., 3-dimensional section 116(N)) may be situated between 200 feet above sea level and 300 feet above sea level, and so on and/so forth.

In some embodiments, the vertical heights of the layers of 3-dimensional sections may remain constant throughout the layers. However, in other embodiments, the vertical heights of the layers of 3-dimensional sections may increase as height above ground level increases, or decrease as height above ground level increases. In still other embodiments, the vertical heights assigned to the layers of 3-dimensional sections may vary according to other factors. Such factors may include the distribution of manmade structures in the area, atmospheric conditions in an area, natural terrain features in the area, and/or so forth. The atmospheric conditions in the area may include temperature, air density, rate of precipitation, and/or other conditions that affect radio signal propagation. Accordingly, the vertical heights of the layers may be designated such that the 3-dimensional sections in each layer have more radio signal propagation characteristics (e.g., signal path loss) in common with each other than with the 3-dimensional sections in the other layers.

The coverage forecast engine 112 may generate the coverage model 114 based on network configuration data and environmental data. The network configuration data may include configuration information for the base stations in an area. The configuration information for a base station may include site location, antenna height, antenna type, antenna orientation, antenna down tilt angle, radio frequency (RF) band, RF power output, data transmission rate, and/or so forth. The environmental data may include information on natural obstacles (e.g., mountain 118), manmade structures (e.g., building 120), terrain contours, vegetation/biomass distribution, and/or other factors that cause path attenuation of radio signals.

The coverage forecast engine 112 may use the coverage model 114 to forecast the robustness of network signals at particular locations within specific 3-dimensional sections above the area. In some instances, such forecasting may be performed in response to queries from UAV operators. In other embodiments, the coverage forecast engine 112 may use the coverage model 114 to forecast network signal robustness along a flight path of an UAV. The robustness of a network signal may be expressed in a multitude of ways, such as via signal strength values or signal quality values. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. The forecasted network signal robustness values may be used to determine whether the network coverage along the flight path that traverses multiple 3-dimensional sections of airspace meets a minimum robustness threshold.

In the event network coverage robustness at certain portions of the flight path fail to meet the minimum network coverage robustness threshold, network signal robustness values forecasted by the coverage model 114 may be used to modify the portions of the flight path. The modifications are performed such that the robustness of network coverage at all portions of the flight path are above the minimum robustness threshold. In additional embodiments, measured network signal robustness values in the 3-dimensional sections of airspace obtained from UAVs or other data sources may be used as feedback data by the coverage forecast engine 112 to further update the coverage model to increase the accuracy of the network coverage quality forecasts. In further embodiments, the coverage forecast engine 112 may update the coverage model 114 based on modifications to the network configuration data or environmental data.

Example Coverage Forecast Engine Components

Figure 2:
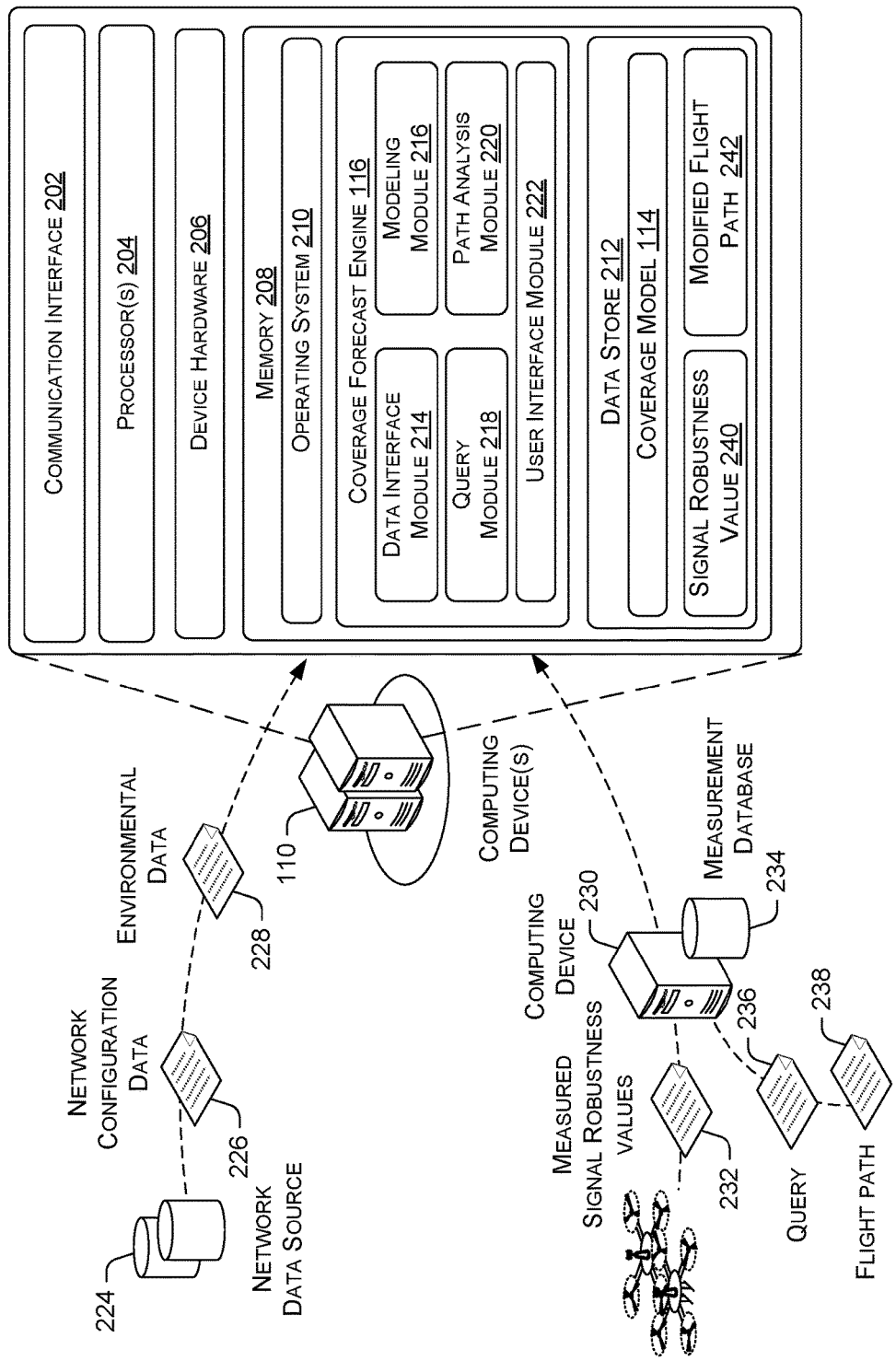
FIG. 2 is a block diagram showing various components of a coverage forecast engine that performs three-dimensional network coverage modeling for a wireless communication network.

FIG. 2 is a block diagram showing various components of a coverage forecast engine that performs three-dimensional network coverage modeling for a wireless communication network. The coverage forecast engine 112 may be implemented on one or more computing devices 110. The computing devices 110 may be a part of the radio access network or the core network 104. Alternatively, the computing devices 110 may be operated by a third-party service provider that is distinct from the wireless communication network 102. The computing devices 110 may include general purpose computers, servers, or other electronic devices that are capable of receive inputs, process the inputs, and generate output data. In other embodiments, the computing devices 110 may be virtual computing devices in the form of virtual machines or software containers that are hosted in a cloud.

The computing devices 110 may include a communication interface 202, one or more processors 204, memory 206, and device hardware 208. The communication interface 202 may include wireless and/or wired communication components that enable the computing devices to transmit data to and receive data from other networked devices via the wireless communication network 102 and/or an additional network. For example, the additional network may be local area network (LAN), a larger network such as a wide area network (WAN), or a collection of networks, such as the Internet. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 110 may implement an operating system 210 and the coverage forecast engine 112. The operating system 210 may include components that enable the computing devices 110 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The memory 206 may further contain a data store 212.

The coverage forecast engine 112 may include a data interface module 214, a modeling module 216, a query module 218, a path analysis module 220, and a user interface module 222. These modules may include routines, program instructions, objects, and/or data structures that perform particular tasks or implement particular abstract data types. The data interface module 214 may use a scheduler to check for and retrieve data from multiple data sources, such as the network data source 224. The scheduler may perform the checking and retrieval based on configurable policies. For example, a configurable policy may specify the source data location, frequency of data retrieval, data retention period, and data disposal date/time. In various embodiments, the data interface module 214 may employ data adapters to obtain data files from the data sources. The data adapters may use file transfer protocol (FTP), Hypertext Transfer Protocol (HTTP) posts, direct network infrastructure element connection, and/or other data transfer protocols to retrieve the data files from the data sources. The data may be in the form of JavaScript Object Notation (JSON) records, Structured Query Language (SQL) records, and/or so forth.

In some embodiments, the data interface module 214 may perform data integrity tests to verify that the integrity of the received data files. In some instances, the data files that are received by the data interface module 214 may contain encrypted data. Accordingly, the data interface module 214 may use an asymmetric or symmetric encryption algorithm to decrypt the data. The data interface module 214 may further merge data from multiple data files, such that the merged data may be fed into other modules for analysis.

In various embodiments, the data interface module 214 may retrieve network configuration data 226 and the environmental data 228 from the network data source 224. The network configuration data 226 may include configuration information for the base stations in an area. The configuration information for a base station may include site location, antenna height, antenna type, antenna orientation, antenna down tilt angle, RF band, RF power output, data transmission rate, and/or so forth. The environmental data 228 may include information on natural obstacles (e.g., mountain 118), manmade structures (e.g., building 120), terrain contours, vegetation/biomass distribution, and/or other factors that cause path attenuation of radio signals. The data interface module 214 may further retrieve measured coverage data from multiple data sources. For instance, a wireless carrier operator of the wireless communication network 102 may conduct UAV test flights to measure network signal robustness values at different locations in the area. In another instance, a third-party UAV operator may equip its UAVs with network signal measurement instruments to collects network signal robustness values in a measurement database. Accordingly, the third-party UAV operator may collect network signal robustness values for storage in a measurement database as its UAVs perform routine activities. Each entry in a measurement database may include information such as a signal robustness value, the set of 3-dimensional coordinates (i.e., longitude value, latitude value, and altitude value) at which the signal robustness value is measured, the associated RF band, the time and date of measurement, and/or so forth. Thus, the data interface module 214 may interact with a computing device 230 to retrieve measured signal robustness values 232 from a measurement database 234 that is maintained by the wireless communication network 102 or the third-party UAV operator.

The modeling module 216 may generate a coverage model, such as the coverage model 114, that is used to predict additional signal robustness values at multiple sets of 3-dimensional coordinates in an airspace over an area. The multiple set of 3-dimensional coordinates may be located in various vertically layered 3-dimensional sections of the airspace above the area. In some embodiments, the vertical and horizontal dimensions of the 3-dimensional sections may be manually inputted into the modeling module 216 by a user. For example, the user may designate the horizontal boundaries of the 3-dimensional sections to mirror the signal boundaries of network cells, and designate the vertical height of the 3-dimensional sections at regular increments, such as every 100 feet from the ground level.

In other embodiments, the vertical dimensions of the 3-dimensional sections in the various layers may be automatically designated by the modeling module 216 based on multiple factors. Such factors may include the distribution of manmade structures in an area, atmospheric conditions in an area, natural terrain features in the area, and/or so forth. The atmospheric conditions in the area may include temperature, air density, rate of precipitation, and/or other conditions that affect radio signal propagation. Accordingly, the vertical heights of the layers may be designated such that the 3-dimensional sections in each layer have more radio signal propagation characteristics (e.g., signal path loss) in common with each other than with the 3-dimensional sections in the other layers.

The modeling module 216 may use machine learning algorithms to generate a coverage model, such as the coverage model 114. Various classification schemes (explicitly and/or implicitly trained) and/or systems may be employed by the modeling module 216 for the generation of the coverage model. A classifier is a function that maps an input attribute vector, $x=(x_1, x_2, x_3, x_4, x_n)$, to a confidence that the input belongs to a class, that is, $f(x)$=confidence(class). Such classification may employ a probabilistic and/or statistical-based analysis (e.g., factoring into the analysis utilities and costs) to generate the coverage model. A support vector machine (SVM) is an example of a classifier that may be employed by the modeling module 216. The SVM operates by finding a hypersurface in the space of possible inputs, which hypersurface attempts to split the triggering criteria from the non-triggering events. Other directed and undirected model classification approaches include, e.g., naive Bayes, Bayesian networks, decision trees, neural networks, fuzzy logic models, and probabilistic classification models providing different patterns of independence may also be employed.

The training data that is used by the modeling module 216 to generate the coverage model may include the network configuration data 226 for an area, the environmental data 228 for the area, and the locations of the dimensional boundaries of the vertically layered 3-dimensional sections in the airspace of the area. The training data may further include measured signal robustness values at various locations, i.e., sets of 3-dimensional coordinates in the airspace of the area. In some instances, each signal robustness value that is used as training data may be associated with an altitude range rather than a specific altitude coordinate. For example, a signal robustness value may be inputted into the modeling module 216 as being associated with an altitude range of 100-200 feet above sea level, rather than being associated with an altitude coordinate of 160 feet above sea level. In such instances, the altitude ranges associated with the signal robustness values may correspond to the vertical heights of the vertically layered 3-dimensional sections. The use of such signal robustness values may reduce model generation complexity and/or decrease the generation time of the coverage model. Accordingly, the modeling module 216 may generate a coverage model that is able to forecast signal robustness values for different sets of 3-dimensional coordinates that are located in the airspace of the area.

In various embodiments, the coverage model may forecast a signal robustness value, or vector of signal robustness values, for a given location. In other words, given a location $(x, y, z)$, a coverage model function $C_M(x, y, z)$ may provide a signal robustness value $R_S$, or a set of wireless signal robustness values $R(R_{S1}, R_{S2}, \ldots, R_{SN})$. The values in the set values R are not necessarily order dependent. The coverage model function CM theoretically provides signal robustness for every spatial point for the domain of the function. In actual practice, creating a deterministic $C_M$ for all spatial points in the domain is not practical. Accordingly, if robustness can be determined for a substantial amount of spatial points in the domain, the air space above an area being modeled may be subdivided into gradients, that is, volumes of airspace with substantially similar wireless signal robustness values. Two wireless signal robustness values are substantially similar if the two values are within a predetermined distance (usually a scalar difference) of each other. For example, if the signal robustness values are a set of values, the two sets are substantially similar if all the values are within a predetermined distance of each other.

One difficulty in generating a deterministic coverage model function $C_M$ is that coverage conditions are not necessarily static. For example, buildings and topography may generally be the same over time, but weather will change on a daily and sometimes hourly basis. A sudden thunderstorm may drastically change signal robustness. Even buildings and topography are semi-static at best. New buildings are being built, and hills once covered with trees, might be replaced with a residential subdivision thereby changing coverage. Network conditions may drastically change ranging from the addition of new base stations, to the failure of an antenna or even a base station.

Accordingly, a proper coverage model function takes into account not just spatial inputs, but also network and environmental inputs. Such an extended coverage model function $C_{ME}$ $(x, y, z, N_1, N_2 \ldots N_m, E_1, E_2, \ldots E_n)$ may generates $R_S$ or set R given not only the spatial variables, but network conditions $N_1 \ldots N_m$ in the network configuration data 226 and environmental conditions $E_1 \ldots E_n$ in the environmental data 228. Thus, the extended coverage model $C_{ME}$ may generate gradients not just for spatial locations, but also for network and/or environmental conditions. To address the wide range of dynamic changes, the modeling module 216 may generate an initial coverage model based on training data for one or more locations. Training data may be collected from different sources, in which the primary training data may be collected via UAVs flying and measuring signal robustness for those locations.

However, it may be impractical to collect data for all dynamic conditions. In such an instance, the primary training data may be supplemented with data extrapolated from other locations. Specifically, the modeling module 216 may obtain data extrapolate such data, and cluster the data based on network conditions and/or environment conditions. From those clusters, the modeling module 216 may extrapolate changes in signal robustness values. For instance, if data from another location clusters data into a first cluster with $E_5$ at value A and a second cluster with $E_5$ at value B, with all other values substantially similar, and signal robustness drops by 30% for value B, the modeling module 216 may generate supplementary training data by generated a copy of the primary data, except showing $N_5$ modified with respect to the original $N_5$ value based on the change from A to B, and showing a similar change in the signal robustness value.

By way of example, there may be two test data records from two different locations: $C_{ME}$ (100, 100, 100, $N_1$, $N_2$, 5, $E_1$, $E_2$, $E_3$)=10 and $C_{ME}$ (105, 103, 97, $N_1$, $N_2$, 10, $E_1$, $E_2$, $E_3$)=7,in which the first three variables are spatial variables x, y, z. In other words, a doubling of $N_3$ resulted in a 30% drop in $R_S$. Further, the primary training data may contain the following value: $C_{ME}$ (202, 65, 22, $N_1$, $N_2$, 18, $E_1$, $E_2$, $E_3$)=20. In such a scenario, the modeling module 216 may extrapolate a secondary training value by doubling $N_3$ but dropping $R_S$ by 30% as well, resulting in $C_{ME}$ (202, 65, 22, $N_1$, $N_2$, 36, $E_1$, $E_2$, $E_3$)=14. In various instances, the extrapolation may not be a doubling or a percentage. Rather, based on the network or environmental variable, the changes may be additive, multiplicative, binary, logical, or in any mathematically deterministic relationship. In practice, as real-world measured signal robustness values are collected, the modeling module 216 may preferentially use the real-world data over the secondary data. Accordingly, the use of secondary data by the modeling module 216 may be phased out as historical data is collected. From time to time, the machine learning algorithms may be retrained with larger portions of historical data as secondary extrapolated data are removed.

Accordingly, the modeling module 216 may update the coverage model based on updates to the training data in the form of an updated version of the network configuration data 226, an updated version of the environmental data 228, and/or new measured signal robustness values 232. In some embodiments, the retrieval of such data may trigger the modeling module 216 to generate a new version of the coverage model. In other embodiments, the modeling module 216 may store updates that are received in particular time periods in the data store 212, and then generate a new version of the coverage model at regular intervals based on the updates stored during the particular time periods.

The query module 218 may receive third party queries for signal robustness values at various sets of 3-dimensional coordinates. For example, the computing device 230 of a third-party UAV operator may send a query 236 to the coverage forecast engine 112. In various embodiments, the query module 218 may contain an application program interface (API) that may be called by an application on the computing device 230 to request a signal robustness value for a set of 3-dimensional coordinates. In response, the query module 218 may use a coverage model, such as the coverage model 114, to predict a signal robustness value for the set of 3-dimensional coordinates. The query module 218 may then return the predicted signal robustness value for the set of 3-dimensional coordinates to the computing device 230.

The path analysis module 220 may analyze flight paths that are uploaded by third-parties, such as third party UAV operators, for validating network coverage along the flight paths. For example, the computing device 230 of a third-party UAV operator may send a proposed flight path of a UAV to the coverage forecast engine 112. In various embodiments, the query module 218 may contain another API that may be called by an application on the computing device 230 to request a network coverage validation for the flight path. A flight path may contain multiple sets of 3-dimensional coordinates the define the flight path. The path analysis module 220 may use a coverage model to forecast the signal robustness value at each set of 3-dimensional coordinates. Subsequently, the path analysis module 220 may compare the signal robustness values to a minimum signal robustness threshold. In some instances, the minimum signal robustness threshold may be a threshold value that is inputted by the third-party along with the flight path for analysis. In other instances, the minimum signal robustness threshold may be a threshold value that is preset by user input to the coverage forecast engine 112.

The comparison of the signal robustness values to the minimum signal robustness threshold by the path analysis module 220 may reveal one or more signal robustness values that are below the minimum signal robustness threshold. When configured by an inputted setting, such failing robustness values may trigger the path analysis module 220 to modify the flight path. In some embodiments, the path analysis module 220 may be triggered to modify the flight path when a number of such failing signal robustness values reaches a predetermined value threshold. In other embodiments, the path analysis module 220 may be triggered to perform the modification when the sets of the 3-dimensional coordinates that correspond to the failing signal robustness values indicates that the distance traveled for such failing values exceeds a predetermined distance threshold. In still other embodiments, a third-party may have provided an estimated speed of travel for the portion of the flight path that corresponds to the set of 3-dimensional coordinates that are associated with the failing values. As such, the path analysis module 220 may calculate an amount of time for traversing a distance during which the signal robustness values are below the minimum signal robustness threshold. Accordingly, the path analysis module 220 may be triggered to modify the flight path when the amount of time exceeds a predetermined time threshold. The modification of a flight path by the path analysis module 220 is further illustrated in FIG. 3.

Figure 3:
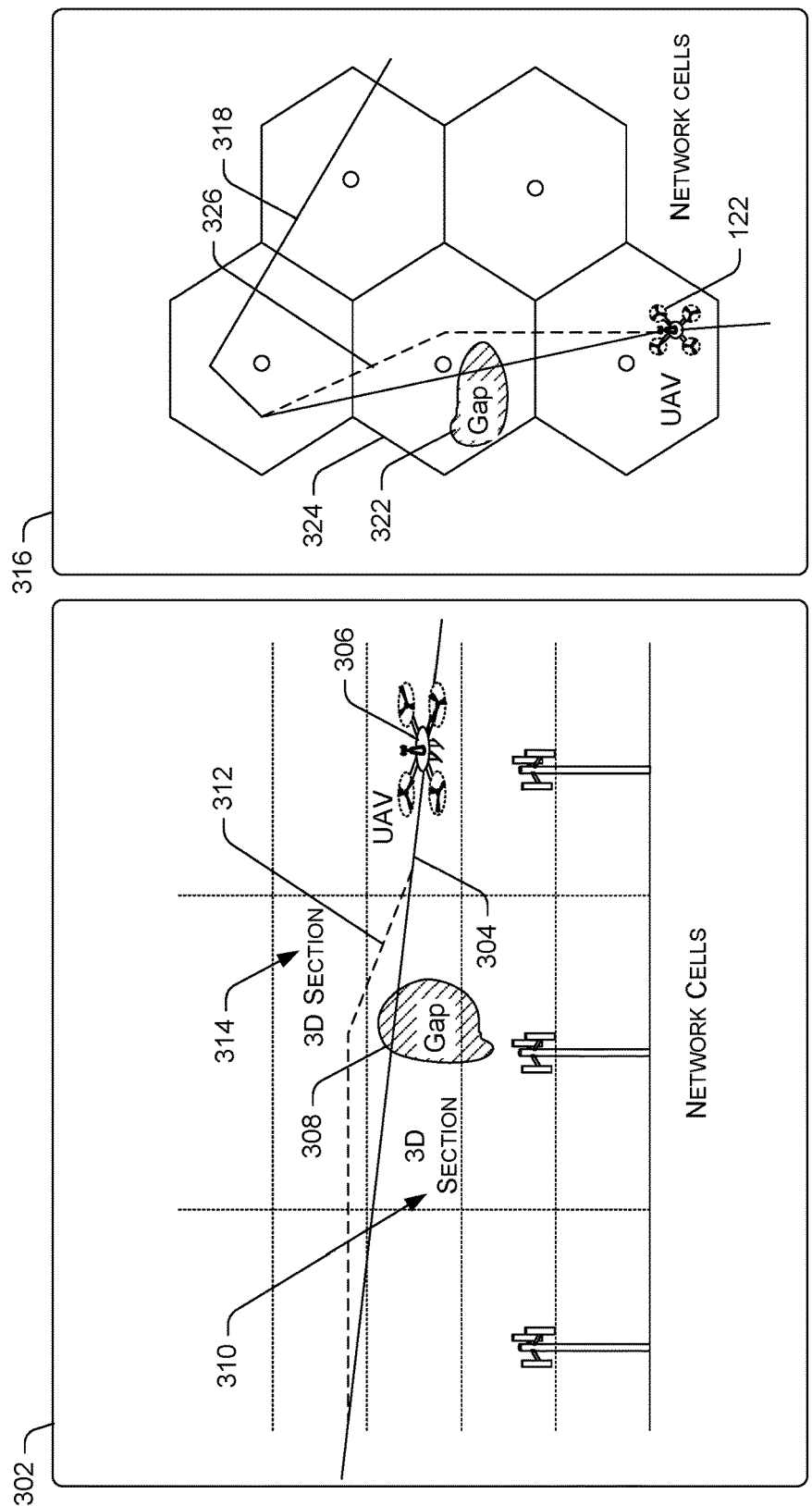
FIG. 3 is a diagram showing UAV flight path modifications for bypassing a region of a 3-dimensional section or the 3-dimensional section of airspace with poor network coverage robustness.

FIG. 3 is a diagram showing UAV flight path modifications for bypassing a region of a 3-dimensional section or the 3-dimensional section of airspace with poor network coverage robustness. As shown in scenario 302, the proposed flight path 304 of a UAV 306 may intersect a coverage gap 308 in a 3-dimensional section 310. The coverage gap 308 is a region where the path analysis module 220 has determined that the signal robustness values of the network coverage provided by the wireless communication network 102 do not meet a minimum signal robustness threshold. Accordingly, the path analysis module 220 may generate an alternative flight path portion 312 for the flight path 304 that bypasses the coverage gap 308. The alternative flight path portion 312 may traverse a different 3-dimensional section, such as the 3-dimensional section 314, in which signal robustness values along the alternative flight path portion 312 meets or exceeds the minimum signal robustness threshold. While the 3-dimensional section 314 is shown as being above the 3-dimensional section 310 in FIG. 3, the 3-dimensional section 314 may also be below or adjacent to the 3-dimensional section 310 in other instances.

In scenario 316, the proposed flight path 318 of a UAV 320 may intersect a coverage gap 322 in a 3-dimensional section 324 that is similar in nature to the coverage gap 308. Accordingly, the path analysis module 220 may generate an alternative flight path portion 326 for the flight path 318 that bypasses the coverage gap 322. The alternative flight path portion 326 may traverse a portion of the 3-dimensional section 324 in which signal robustness values along the alternative flight path portion 326 meet or exceed the minimum signal robustness threshold.

Returning to FIG. 2, the modified flights may be transmitted by the path analysis module 220 to the computing device 230 of a third party that submitted a proposed flight path. However, in instances in which a user has deactivated the flight path modification function of the path analysis module 220, the path analysis module 220 may return an indication that network coverage for the proposed flight path is inadequate to the computing device 230. In some embodiments, the indication may include location information or map visualization information for one or more coverage gaps that affect the proposed flight path. Alternatively, the comparison of the signal robustness values of a proposed flight path to the minimum signal robustness threshold by the path analysis module 220 may lead to a determination that the values meet or exceed the minimum signal robustness threshold. In such an instance, the path analysis module 220 may return an indication that the proposed flight is acceptable to the computing device 230.

The user interface module 222 may enable a user to interact with the coverage forecast engine 112 via a user interface controls. The user interface controls may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods. Accordingly, the user may input dimensional values for the 3-dimensional sections of airspace over an area, establish the minimum signal robustness threshold, configure other threshold values and settings, and/or so forth.

The data store 212 may store data that are processed or generated by the coverage forecast engine 112. The data store 212 may include one or more databases, such as relational databases, object databases, object-relational databases, and/or key-value databases that store data. For example, data stored in the data store 212 may include the coverage model 114, signal robustness values 240, modified flight path 242, and/or other data.

Example Processes

Figure 4:
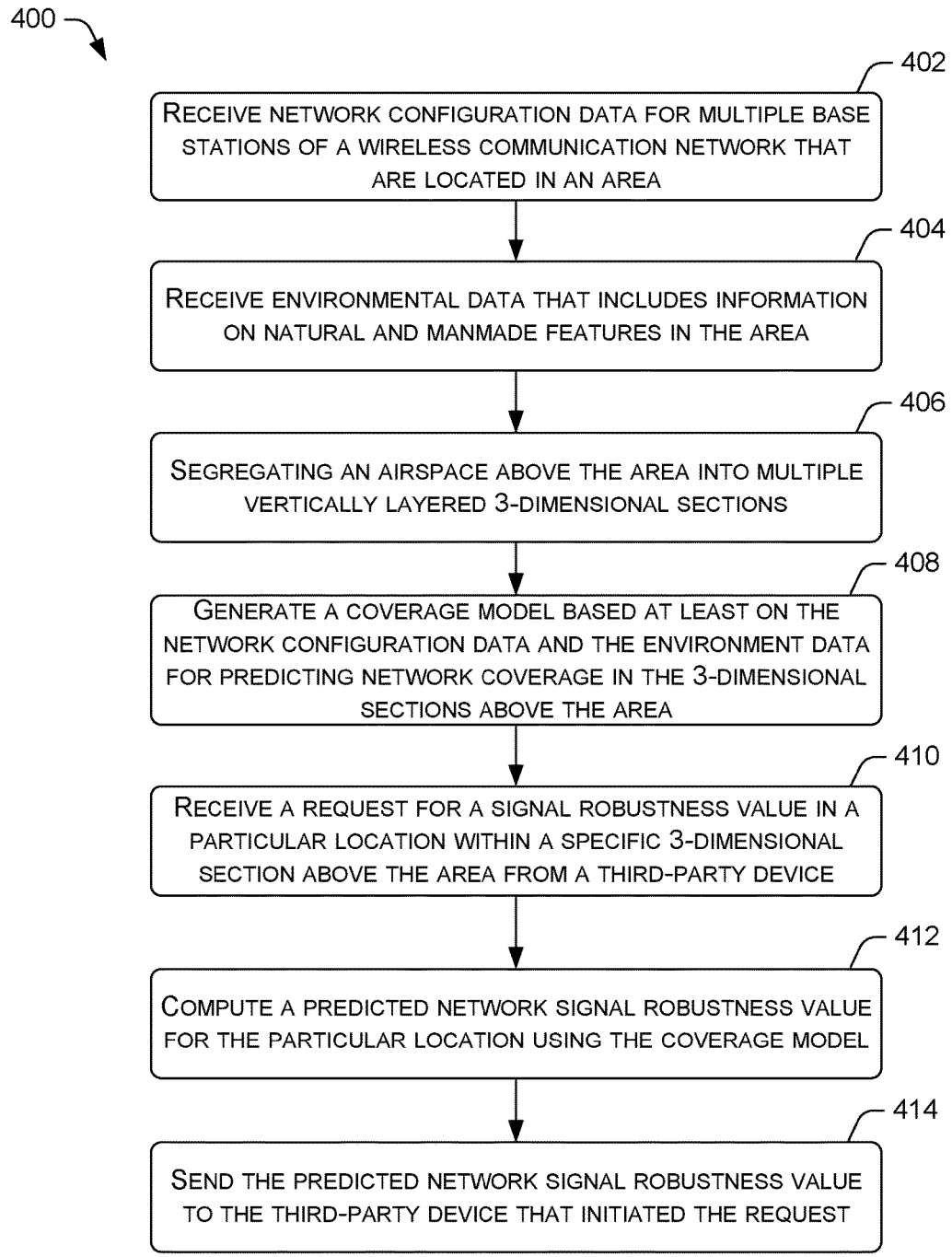
FIG. 4 is a flow diagram of an example process for generating and using a coverage model to compute a network signal robustness of a wireless communication network for a location in a 3-dimensional section of airspace.
Figure 5:
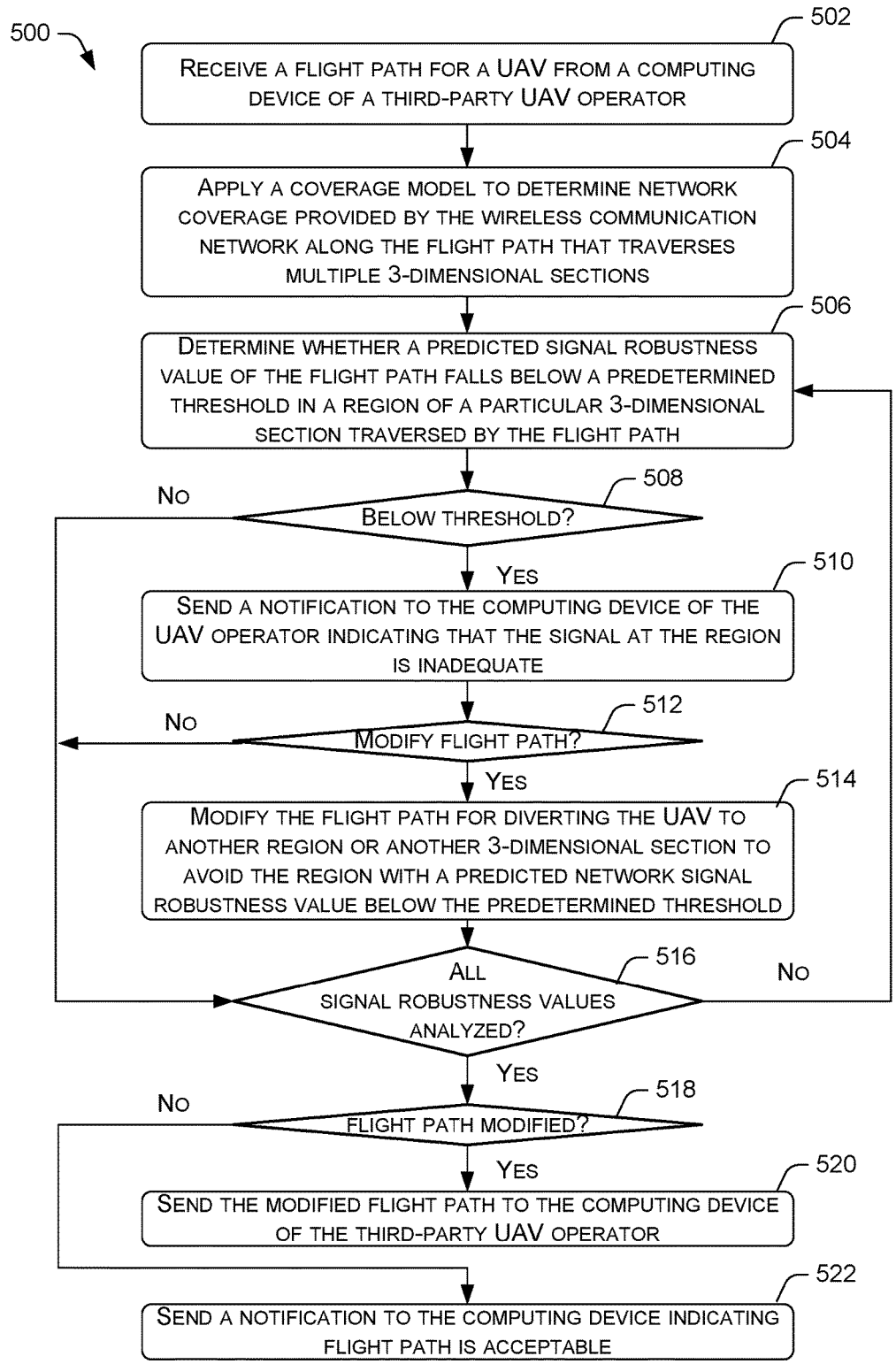
FIG. 5 is a flow diagram of an example process for using a coverage model to validate network coverage robustness of a wireless communication network along a UAV flight path.
Figure 6:
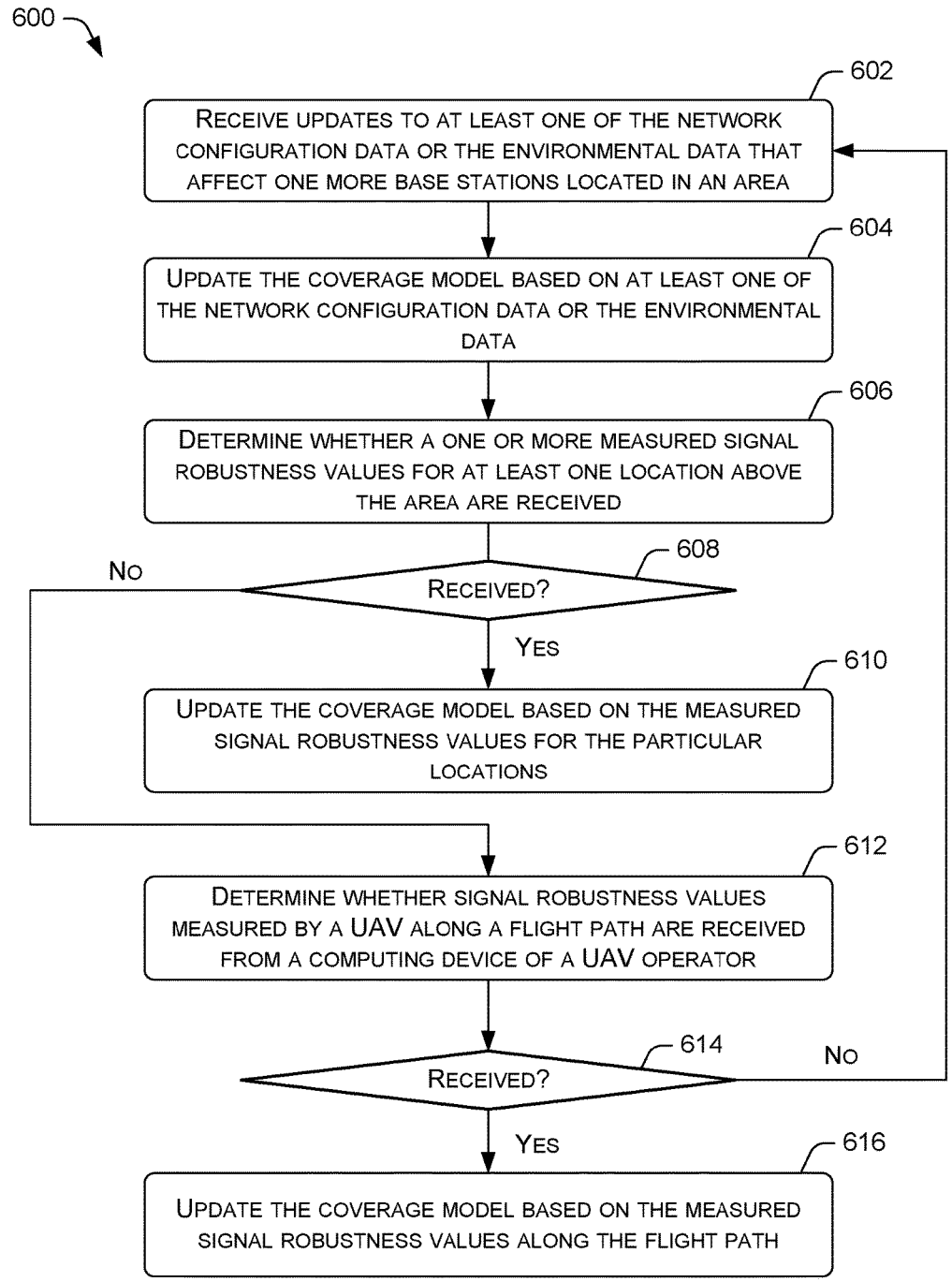
FIG. 6 is a flow diagram of an example process for updating a coverage model that is used to predict network coverage robustness of a wireless communication network.

FIGS. 4-6 present illustrative processes 400-600 for implementing three-dimensional network coverage modeling. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the environment 100 of FIG. 1.

FIG. 4 is a flow diagram of an example process 400 for generating and using a coverage model to compute a network signal robustness of a wireless communication network for a location in a 3-dimensional section of airspace. At block 402, the coverage forecast engine 112 may receive network configuration data 226 for multiple base stations of a wireless communication network located in an area. In various embodiments, the network configuration data 226 may include information on site location, antenna height, antenna type, antenna orientation, antenna down tilt angle, RF band, RF power output, data transmission rate, and/or so forth, for multiple base stations.

At block 404, the coverage forecast engine 112 may receive environmental data 228 for natural and manmade features in the area. In various embodiments, the environmental data 228 may include information on natural obstacles, manmade structures, terrain contours, vegetation/biomass distribution, and/or other factors that cause path attenuation of radio signals. At block 406, the coverage forecast engine 112 may segregate an airspace above the area into multiple vertically layered 3-dimensional sections. In various embodiments, a 3-dimensional section may be horizontally bounded by the ground level signal boundaries of a network cell or multiple network cells. Further, the vertically layered 3-dimensional sections may be vertically bounded by altitudes above ground level.

At block 408, the coverage forecast engine 112 may generate a coverage model 114 based on the network configuration data 226 and the environmental data 228. The coverage model 114 may be used to predict network coverage in the 3-dimensional sections above the area. In various embodiments, the coverage model 114 may be generated using a machine learning algorithm that uses the network configuration data, the environmental data 228, the boundary locations of the 3-dimensional sections as training data. The training data may further include known signal robustness values at various 3-dimensional coordinates in the airspace of the area.

At block 410, the coverage forecast engine 112 may receive a request for a signal robustness value of a particular location within a specific 3-dimensional section above the area from a third-party device. In various embodiments, the signal robustness value may be a signal strength measurement or a signal quality measurement. At block 412, the coverage forecast engine 112 may use the coverage model 114 to compute a predicted network signal robustness value for the particular location. At block 414, the coverage forecast engine 112 may send the predicted network signal robustness value to the third-party device that initiated the request.

FIG. 5 is a flow diagram of an example process 500 for using a coverage model to validate network coverage robustness of a wireless communication network along a UAV flight path. At block 502, the coverage forecast engine 112 may receive a flight path for a UAV from a computing device (e.g., computing device 230). The computing device may belong to a third-party UAV operator that uses the wireless communication network 102 to communicatively link the UAV to a ground-based control device. The coverage forecast engine 112 may receive the flight path from an application on the computing device along with a request for network coverage validation of the flight path. A flight path may contain multiple sets of 3-dimensional coordinates the define the flight path, in which the flight path traverses multiple 3-dimensional sections. At block 504, the coverage forecast engine 112 may apply the coverage model 114 to determine network coverage provided by the wireless communication network 102 along the flight path that traverses multiple 3-dimensional sections.

At block 506, the coverage forecast engine 112 may determine whether a predicted signal robustness value of the flight path falls below a predetermined minimum signal robustness threshold in a region of a particular 3-dimensional section traversed by the flight path. Thus, at decision block 508, if the coverage forecast engine 112 determines that the predicted signal robustness value is below the minimum signal robustness threshold ("yes" at decision block 508), the process 500 may proceed to block 510. At block 510, the coverage forecast engine 112 may send a notification to the computing device that indicates the signal at the region is inadequate.

At decision block 512, the coverage forecast engine 112 may determine whether the flight path that traverses the region with the inadequate predicted signal robustness value is to be modified. In some embodiments, the coverage forecast engine 112 may make such determination based on a setting that is a part of the request for network coverage validation. In other embodiments, such a determination may be made based on a setting that is inputted into the coverage forecast engine 112 by an administrator.

According, if the coverage forecast engine 112 determines that the flight path is to be modified ("yes" at decision block 512), the process 500 may proceed to block 514. At block 514, the coverage forecast engine 112 may modify the flight path for diverting the UAV to another region or another 3-dimensional section to avoid the region with the predicted network signal robustness value below the predetermined threshold. In other words, the UAV may be diverted such that the diverted portion of the flight path receives adequate network coverage, i.e., network signal robustness values along the diverted portion meets or exceeds the minimum signal robustness threshold.

At decision block 516, the coverage forecast engine 112 may determine whether all signal robustness values along the flight path have been analyzed. If not all of the signal robustness values are analyzed ("no" at decision block 516), the process 600 may loop back to block 506 such that another predicted signal robustness value of the flight path may be analyzed. However, if all of the signal robustness values are analyzed ("yes" at decision block 516), the process 500 may proceed to decision block 518. At decision block 518, the coverage forecast engine 112 may determine whether the flight path has been modified. If the flight path is determined to be modified ("yes" at decision block 518), the process 500 may proceed to block 520. At block 520, the coverage forecast engine 112 may send the modified flight path to the computing device of the third-party UAV operator. However, if the flight path is determined to be not modified ("no" at decision block 518), the process 500 may proceed to block 520. At block 520, the coverage forecast engine 112 may send a notification to the computing device of the third-party UAV operator indicating that the flight path is acceptable.

Returning to decision block 508, if the coverage forecast engine 112 determines that the predicted signal robustness value is not below the threshold ("no" at decision block 508), the process 500 may proceed directly to decision block 516.

FIG. 6 is a flow diagram of an example process 600 for updating a coverage model that is used to predict network coverage robustness of a wireless communication network 102. At block 602, the coverage forecast engine 112 may receive updates to at least one of the network configuration data or environmental data that affect one or more base stations located in an area. At block 604, the coverage forecast engine 112 may update the coverage model 114 based on at least one of the network configuration data or the environmental data. The update of the coverage model 114 may include the generation of a new version of the coverage model 114 using at least one of the network configuration data or the environmental data as part of training data.

At block 606, the coverage forecast engine 112 may determine whether one or more measured signal robustness values for at least one location above the area are received from a data source. In various embodiments, the one or more measured signal robustness values may include values that are measured by third-parties (e.g., UAV operators) or a wireless carrier operator of the wireless communication network 102. Thus, at decision block 608, if the coverage forecast engine 112 determines that the one or more measured signal robustness values are received ("yes" at decision block 608), the process 600 may proceed to block 610. At block 610, the coverage forecast engine 112 may update the coverage model 114 based on the one or more measured signal robustness values. The update of the coverage model 114 may include the generation of a new version of the coverage model 114 using at least the one or more measured signal robustness values as training data.

At block 612, the coverage forecast engine 112 may determine whether signal robustness values measured by a UAV along a flight path above the area are received from a computing device (e.g., computing device 230) of a UAV operator. Thus, at decision block 614, if the coverage forecast engine 112 determines that the signal robustness values measured along the flight path are received ("yes" at decision block 614), the process 600 may proceed to block 616. At block 616, the coverage forecast engine 112 may update the coverage model 114 based on the signal robustness values measured along the flight path. The update of the coverage model 114 may include the generation of a new version of the coverage model 114 using at least the measured signal robustness values along the flight path as training data.

The use of a coverage model to forecast network coverage robustness for vertically layered 3-dimensional sections of airspace may offer greater prediction accuracy than the 2-dimensional conventional coverage models. As a result, a coverage model that is able to forecast network coverage robustness for vertically layered 3-dimensional sections of airspace may be suited to predict network coverage for UAV command and control.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors; and
memory having instructions stored therein, the instructions, when executed by the one or more processors, cause the one or more processors to perform acts comprising:
receiving network configuration data for multiple base stations of a wireless communication network that are located in an area;
receiving environmental data that includes information on natural and manmade features in the area;
segregating an airspace above the area into a plurality of vertically layered 3-dimensional sections; and
generating a coverage model based at least on the network configuration data and the environmental data, the coverage model for predicting network coverage of the wireless communication network in the 3-dimensional sections in the airspace above the area.

2. The system of claim 1, wherein the acts further comprise:
receiving a request for a predicted signal robustness value that measures network coverage in a particular location within a specific 3-dimensional section above the area from a device, the particular location being defined by a longitude value, a latitude value, and an altitude value;
computing the predicted network signal robustness value for the particular location using the coverage model; and
sending the predicted network signal robustness value to the device that initiated the request.

3. The system of claim 1, wherein the predicted signal robustness value is a network signal strength value or network signal quality value, wherein the network signal strength value measures received signal strength indicator (RSSI), reference signal received power (RSRP), or received channel power indicator (RCPI), and signal quality measures energy to interface ratio (ECIO), reference signal received quality (RSRQ), or signal to interference-plus-noise ratio (SINR).

4. The system of claim 1, wherein the acts further comprise:
   receiving a flight path for an unmanned aerial vehicle (UAV) from a computing device of a UAV operator that, the wireless communication network communicatively links the UAV to a ground-based control device;
   applying the coverage model to determine corresponding network coverage provided by the wireless communication network along the flight path that traverses the plurality of vertically layered 3-dimensional sections;
   modifying the flight path for diverting the UAV to another region or another 3-dimensional section to avoid a region of a 3-dimensional section with a predicted network signal robustness value that is below a predetermined minimum signal robustness threshold; and
   sending the flight path that is modified to the computing device of the UAV operator.

5. The system of claim 4, wherein the acts further comprise sending a notification to the computing device of the UAV operator indicating that the flight path is acceptable in response to determining that all signal robustness values of the corresponding network coverage along the flight path is at or exceed the predetermined minimum signal robustness threshold.

6. The system of claim 1, wherein the acts further comprise:
   receiving updates to at least one of the network configuration data or the environmental data that affects one or more base stations of the wireless communication network located in the area; and
   generating an updated coverage model based on the at least one of the network configuration data or the environmental data.

7. The system of claim 1, wherein the acts further comprise:
   receiving one or more measured signal robustness values for at least one location in the airspace above the area or signal robustness values measured by an unmanned aerial vehicle (UAV) along a flight path that traverses multiple 3-dimensional sections in the airspace above the area; and
   generating an updated coverage model based on the one or more measured signal robustness values for at least one location or signal robustness values measured by the unmanned aerial vehicle (UAV) along the flight path.

8. The system of claim 1, wherein the network configuration data includes one or more of site location, antenna height, antenna type, antenna orientation, antenna down tilt angle, radio frequency (RF) band, RF power output, or data transmission rate for the multiple base stations, wherein the environmental data includes information on one or more of natural obstacles, manmade structures, terrain contours, or vegetation/biomass distribution.

9. The system of claim 1, wherein the generating includes applying a machine learning algorithm to training data that includes the network configuration data, the environmental data, and measured signal robustness values at various locations in the airspace of the area to generate the coverage model.

10. The system of claim 1, wherein a 3-dimensional section of the plurality of 3-dimensional sections is horizontally bounded by ground level signal boundaries of a network cell or multiple network cells.

11. The system of claim 1, wherein vertical heights for multiple vertical layers of 3-dimensional sections are established based on multiple factors that affect radio signal propagation in the area, the multiple factors including at least one of distribution of manmade structures in an area, atmospheric conditions in the area, or natural terrain features in the area.

12. One or more non-transitory computer-readable media storing computer-executable instructions that upon execution cause one or more processors to perform acts comprising:
   receiving network configuration data for multiple base stations of a wireless communication network that are located in an area;
   receiving environmental data that includes information on natural and manmade features in the area;
   segregating an airspace above the area into a plurality of vertically layered 3-dimensional sections, wherein vertical heights of the plurality of vertically layered 3-dimensional sections being established based on multiple factors that affect radio signal propagation in the area, the multiple factors including at least one of distribution of manmade structures in an area, atmospheric conditions in the area, or natural terrain features in the area; and
   generating a coverage model based at least on the network configuration data, the environmental data, the coverage model for predicting network coverage of the wireless communication network in the 3-dimensional sections in the airspace above the area.

13. The one or more non-transitory computer-readable media of claim 12, wherein the acts further comprise:
   receiving a request for a predicted signal robustness value that measures network coverage in a particular location within a specific 3-dimensional section above the area from a device, the particular location being defined by a longitude value, a latitude value, and an altitude value;
   computing the predicted network signal robustness value for the particular location using the coverage model; and
   sending the predicted network signal robustness value to the device that initiated the request.

14. The one or more non-transitory computer-readable media of claim 12, wherein the acts further comprise:
   receiving a flight path for an unmanned aerial vehicle (UAV) from a computing device of a UAV operator that, the wireless communication network communicatively links the UAV to a ground-based control device;
   applying the coverage model to determine corresponding network coverage provided by the wireless communication network along the flight path that traverses the plurality of vertically layered 3-dimensional sections;
   modifying the flight path for diverting the UAV to another region or another 3-dimensional section to avoid a region of a 3-dimensional section with a predicted network signal robustness value that is below a predetermined minimum signal robustness threshold; and
   sending the flight path that is modified to the computing device of the UAV operator.

15. The one or more non-transitory computer-readable media of claim 14, wherein the acts further comprise sending a notification to the computing device of the UAV operator indicating that the flight path is acceptable in response to determining that all signal robustness values of the corresponding network coverage along the flight path is at or exceed the predetermined minimum signal robustness threshold.

16. The one or more non-transitory computer-readable media of claim 12, wherein the network configuration data includes one or more of site location, antenna height, antenna type, antenna orientation, antenna down tilt angle, radio frequency (RF) band, RF power output, or data transmission rate for the multiple base stations, wherein the environmental data includes information on one or more of natural obstacles, manmade structures, terrain contours, or vegetation/biomass distribution.

17. The one or more non-transitory computer-readable media of claim 12, wherein the generating includes applying a machine learning algorithm to training data that includes the network configuration data, the environmental data, boundary locations of the plurality of vertically layered 3-dimensional sections, and measured signal robustness values at various locations in the airspace of the area to generate the coverage model.

18. A computer-implemented method, comprising:
receiving, at one or more computing devices, network configuration data for multiple base stations of a wireless communication network that are located in an area, the network configuration data including one or more of site location, antenna height, antenna type, antenna orientation, antenna down tilt angle, radio frequency (RF) band, RF power output, or data transmission rate for the multiple base stations;
receiving, at the one or more computing devices, environmental data that includes information on one or more of natural obstacles, manmade structures, terrain contours, or vegetation/biomass distribution;
segregating, at the one or more computing devices, an airspace above the area into a plurality of vertically layered 3-dimensional sections, wherein vertical heights of the plurality of vertically layered 3-dimensional sections being established based on multiple factors that affect radio signal propagation in the area, the multiple factors including at least one of distribution of manmade structures in an area, atmospheric conditions in the area, or natural terrain features in the area;
applying, at the one or more computing devices, a machine learning algorithm to training data that includes the network configuration data, the environmental data, boundary locations of the plurality of vertically layered 3-dimensional sections, and measured signal robustness values at various locations in the airspace of the area to generate a coverage model, the coverage model for predicting network coverage of the wireless communication network in the 3-dimensional sections in the airspace above the area;
receiving, at the one or more computing devices, a request for a predicted signal robustness value that measures network coverage in a particular location within a specific 3-dimensional section above the area from a device, the particular location being defined by a longitude value, a latitude value, and an altitude value;
computing, at the one or more computing devices, the predicted network signal robustness value for the particular location using the coverage model; and
sending, at the one or more computing devices, the predicted network signal robustness value to the device that initiated the request.

19. The computer-implemented method of claim 18, further comprising:
receiving, at the one or more computing devices, a flight path for an unmanned aerial vehicle (UAV) from a computing device of a UAV operator that, the wireless communication network communicatively links the UAV to a ground-based control device;
applying, at the one or more computing devices, the coverage model to determine corresponding network coverage provided by the wireless communication network along the flight path that traverses the plurality of vertically layered 3-dimensional sections;
modifying, at the one or more computing devices, the flight path for diverting the UAV to another region or another 3-dimensional section to avoid a region of a 3-dimensional section with a predicted network signal robustness value that is below a predetermined minimum signal robustness threshold; and
sending, from the one or more computing devices, the flight path that is modified to the computing device of the UAV operator.

20. The computer-implemented method of claim 18, further comprising;
receiving, at the one or more computing devices, one or more measured signal robustness values for at least one location in the airspace above the area or signal robustness values measured by an unmanned aerial vehicle (UAV) along a flight path that traverses multiple 3-dimensional sections in the airspace above the area; and
generating, at the one or more computing devices, an updated coverage model based on the one or more measured signal robustness values for at least one location or signal robustness values measured by the unmanned aerial vehicle (UAV) along the flight path.

* * * * *